Feb. 21, 1967    J. D. WOLF    3,304,836
AUDIO-VISUAL DISPLAY APPARATUS
Filed Dec. 28, 1964    4 Sheets-Sheet 1
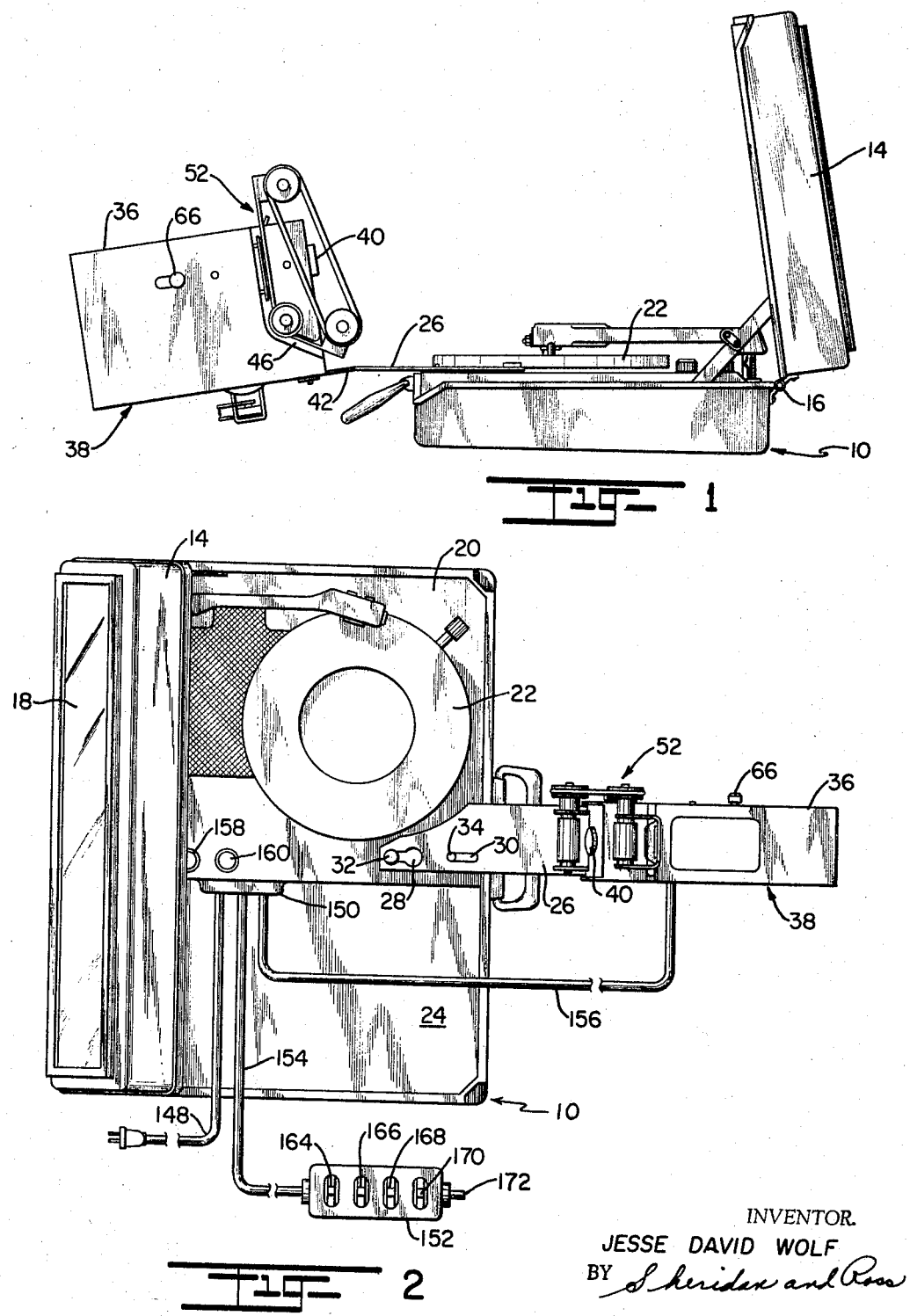
INVENTOR.
JESSE DAVID WOLF
BY Sheridan and Ross
ATTORNEYS

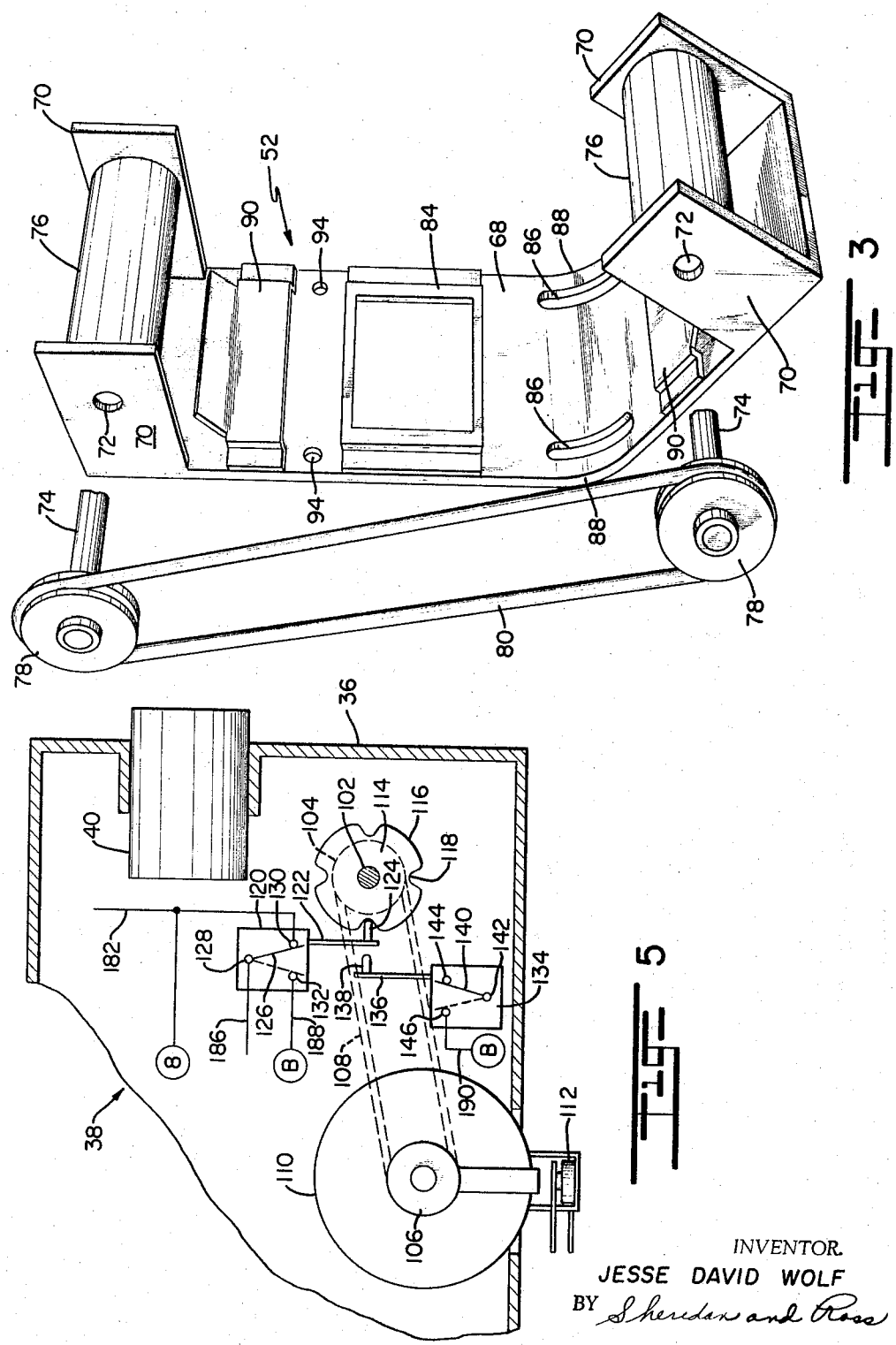

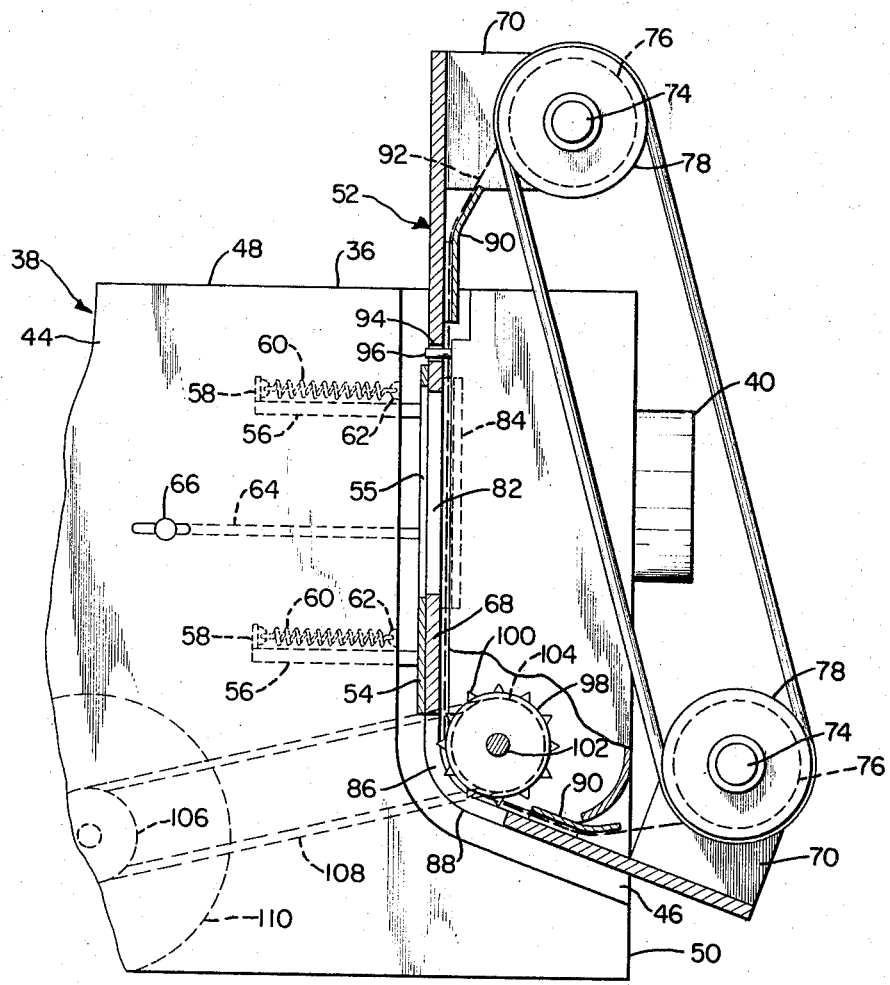

Feb. 21, 1967 J. D. WOLF 3,304,836
AUDIO-VISUAL DISPLAY APPARATUS
Filed Dec. 28, 1964 4 Sheets-Sheet 4
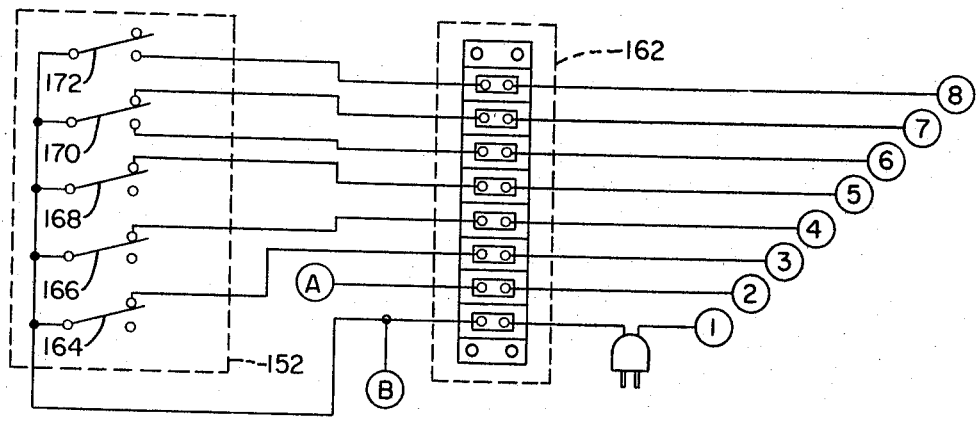
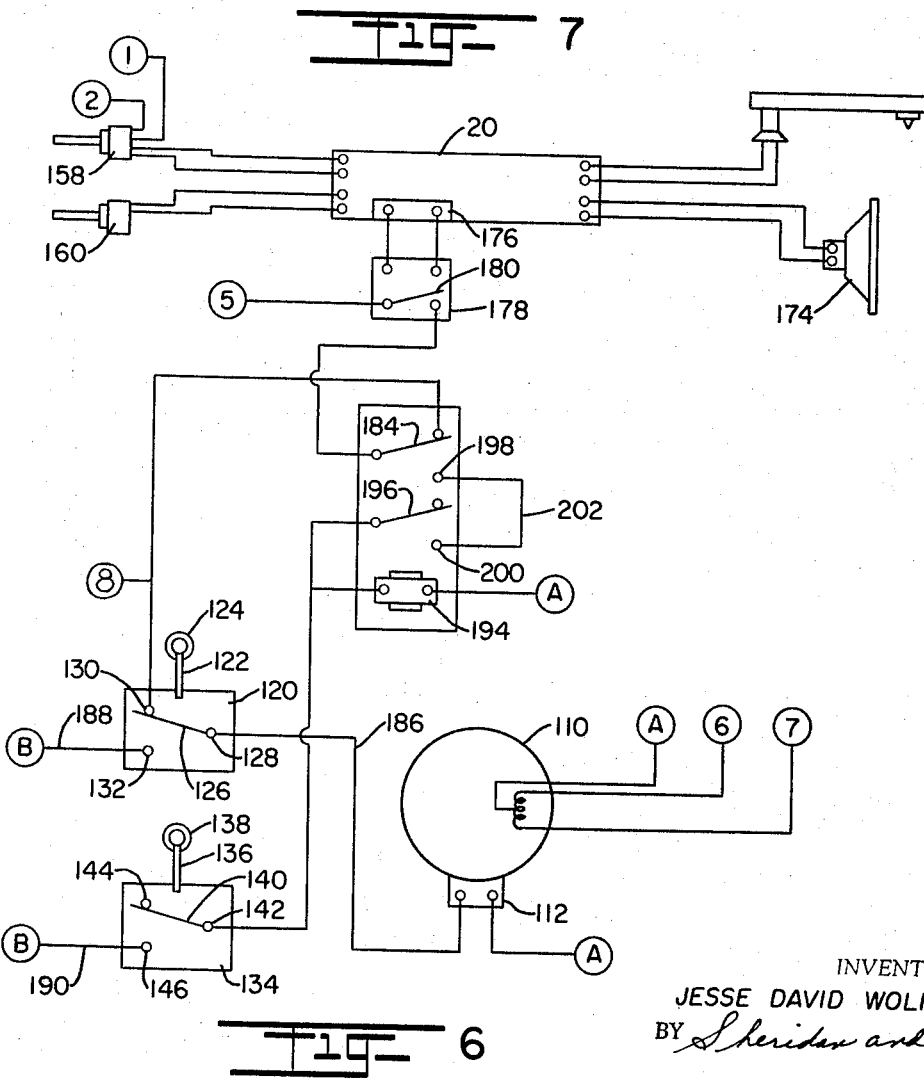
INVENTOR.
JESSE DAVID WOLF
BY Sheridan and Ross
ATTORNEYS

United States Patent Office 3,304,836
Patented Feb. 21, 1967

3,304,836
AUDIO-VISUAL DISPLAY APPARATUS
Jesse D. Wolf, Aurora, Colo., assignor to Audio-Visual Dynamics, Inc., Denver, Colo., a corporation of Colorado
Filed Dec. 28, 1964, Ser. No. 421,181
6 Claims. (Cl. 88—28)

This invention lies in the field of audio-visual display apparatus and relates particularly to a self-contained unit which contains a sound reproducer and directly supports a projector and projection screen in operating condition, and to improved means for loading, supporting, and advancing a film strip in a projector.

There are many strip film sound projectors now available, most of which perform their intended basic functions quite well. However, in general they lack one or more features of importance to the user, such as true portability, compactness, ease of operation, reliability of operation, and ability to perform all desired functions with a minimum amount of equipment. These matters are of great concern in the fields of religious education, sales training, and sales presentation, where the users normally must personally transport the equipment, set it up, and operate it for small groups, such as one to fifteen viewers.

The apparatus of the present invention is particularly compact and portable because all necessary elements are either built in or carried in and supported by a small rugged container, such as an attache case. In a presently preferred form, one part of the interior of the case houses a built in sound reproducer which may be of the phonograph record, tape, or other type. The other part of the interior forms a storage well to receive the projector and its remote control means when not in use. A projection screen is built directly into the lid of the case, and is of the rear projection type so that images projected onto its inner, rear surface will be visible on its outer, forward surface. For this purpose, the lid can be swung on its usual hinge to an upright position, assuming the body of the case to be lying horizontally, preferably with a slight rearward inclination.

A cantilever arm is provided which may be scured directly to the case in a predetermined position extending rearwardly away from the lid and screen. The projector is adapted to be fixedly mountd to the rear free end of the cantilever arm in a position facing forwardly and at the proper distance from the screen to project an image which just fills the screen. Thus it is possible to set up easily and quickly with no problem of moving the projector back and forth to find the right projection distance.

The built in screen and the cantilever mounting for the projector eliminate the weight and complexity of extra stands for supporting these units. As a result, the entire apparatus may be set as a unit on a table, platform, or chair, or even on the floor if occasion demands, without the usual difficulty of relative alignment of projector and screen particularly in the sense of vertical spacing from a support.

In its prferred form the apparatus may be operated in a fully automatic manner, and yet the operator can take over manual control at the flick of a button. In a sales presentation, for example, it is desirable in many instances to present a series of related views showing various features of a product and possibly other views showing operation or manufacture of the product and to have some narration directed particularly to each view. A sound track is provided in record, tape, or other form which may be played on the sound reproduction device mounted in the case. At the end of the narration for a given frame of a film strip a low frequency signal is introduced in the sound track. It may be of the order of 25–50 cycles, well below the frequency of the narration, and its duration is appreciable, preferably about one second. A filter device filters it out of the audio circuit and transmits it to an actuator circuit.

The actuator circuit is connected to an electromechanical drive means carried by the projector and having a sprocket directly engaging the film strip to advance it. By means of several additional circuits and switches the drive means completes a predetermined cycle of movement which advances the film exactly one frame. At the end of the cycle, the drive means acts through the switches and circuitry to bring the advancing action to a halt. Narration for the frame then being projected ensues and is terminated by another low frequency pulse which actuates the drive means again. The functions may be repeated throughout the length of the film strip and the narration will always be in synchronism with the image projection.

A remote control column is provided for controlling practically all of the functions of the apparatus. One button starts and stops the sound reproducr. Hence, if a question is raised and the operator desires to answer it at that time, he merely presses the appropriate button and stops the reproducer. He can then enter into a discussion of the image being projected, or he can press another button to reverse the direction of drive and press a third button to take the film back step by step to any previous view that calls for discussion. He can thereafter return the drive means to the original direction and return the film to the point where he left off. At this time he restarts the sound reproducer and it again proceeds in synchronism with the film.

An extremely simple and effective film cartridge is provided which is inserted in and removed from the projector with minimum effort and mechanical detail and which makes it possible to drive the film in the simplest and most direct manner. The cartridge comprises a slender, elongate body having a film reel support at each end, the body serving as a guide for the film as it passes from one reel to the other. The body is inserted in a simple lateral slot in the side wall of the projector, and the reels and their supports remain outside the casing of the projector. The cartridge body is apertured at an appropriate point for passage of the light through one frame of the film, and this film guide maintains the film portion planar for proper projection. The sprocket which terminates the drive means engages the film sprocket holes directly and constitutes the sole driving means.

As the film moves through the projector, its tension unwinds the supply reel. Pulleys on the support shafts of the supply and takeup reels are interconnected by a belt which is adapted to slip under any appreciable load. Thus, rotation of the supply reel causes rotation of the takeup reel to wind up the film as it leaves the projector. The relative effective diameters of the two reels change constantly because one is winding and the other is unwinding. Hence it is possible to develop undesired tension in the film at some point in the operation, but this tension is relieved by slippage of the belt. Because the reels are not positively driven, the takeup reel cannot develop any tension in the film which could damage it in the event that the film becomes jammed in the projector.

Thus it will be seen that the present invention provides an apparatus which accomplishes all of the functions desired in such a machine, with simple and effective mechanism, and guards against any possibility of damage to the film strip in operation. Various other advantages and features of novelty will become apparent as the description proceeds in conjunction with the accompanying drawings, in which:

FIGURE 1 is a side elevational view of the apparatus of this invention in one preferred form, with the projector mounted on the supporting container in position to project images on the screen;

FIGURE 2 is a top plan view of the apparatus;

FIGURE 3 is a perspective exploded view of the cartridge;

FIGURE 4 is a side elevational view, partly in section, showing the cartridge in cooperative position in the projector;

FIGURE 5 is a sectional elevational view of the projector casing schematically showing certain elements of the film drive and its control;

FIGURE 6 is a diagrammatic illustration of the control circuitry and film drive elements; and FIGURE 7 is a diagrammatic illustration of the control column circuitry.

One preferred form of the invention, utilizing a phonograph turntable and reproducer, is illustrated in FIGURES 1 and 2, where all of the elements are mounted in or carried by an attache type case comprising a container having a main body, portion 10 with a substantially flat bottom wall 12, and a lid portion 14 connected to the body portion by hinge 16. A translucent, rear projection screen 18 is mounted directly in lid portion 14, and the latter may be adjusted to an upright position with a slight rearward inclination as seen in FIGURE 1 for convenience of projecting and viewing. The sound reproducer 20 occupies about half of the body portion 10 and is secured therein. It has a conventional motor drive, not shown, with a magnetic brake to stop turntable 22 immediately when current to the motor is interrupted. The remainder of the body portion forms a storage well 24 to receive various elements of the apparatus for storage and transportation.

A cantilever arm 26, of narrow elongate form, is provided at its forward end with a keyhole slot 28 and a guide slot 30 adapted to register with anchor pin 32 and guide pin 34 on the upper surface of reproducer 20. When the arm is aligned on the pins and pulled rearwardly it is held securely in predetermined position as shown. Similar slots are formed in the rear end of the arm to mate with corresponding pins extending from the bottom of casing 36 of the projector 38. When the projector is mounted and pulled rearwardly to the full extent of the slots it is located with its projection lens 40 at the proper distance from the screen 18 for the projected image to just fill the screen. Arm 26 is provided with a slight bend at 42 to align the projector so that its optical axis will intersect the center of the screen and will be normal to the plane of the screen. The projector is, of course, provided with the usual condenser lenses, projection lamp, and cooling fan.

Considering FIGURES 3 and 4, it will be seen that the casing 36 of projector 38 has a side wall 44 cut away to provide a slot 46. While this slot could extend in a straight line it is preferred to form it as shown for reasons to be described. The slot extends laterally in upper wall 48 and forward wall 50 and is adapted to laterally receive cartridge 52. A pressure plate 54, having a light aperture 55, is movable fore and aft in slot 46 and is carried by pins 56 passing through apertures in the wall forming the rear of the slot. These pins have offset ends 58 which are connected by tension springs 60 to tabs 62 on the slot wall so that the pressure plate is normally urged forwardly. Pin 64 is connected to the mid-portion of the pressure plate, and, at its rear end, carries a button 66 which can be manually engaged by the operator to pull the pressure plate rearwardly to allow entrance of the cartridge into the slot. Release of the button allows the pressure plate to yieldingly urge the cartridge to the forward side of the slot as shown.

Cartridge 52, as best seen in FIGURE 3, comprises a thin, narrow, elongate body 68, preferably of sheet metal, having mounting means at each end in the form of bent up ears 70. The ears are each provided with apertures 72 for the reception of axles or axle shafts 74 to rotatably mount film reels 76. By means of conventional friction fit means the reels are substantially fixed on the axles while the latter are freely rotatable in apertures 72. Each axle fixedly carries at one end a grooved pulley 78 and a continuous coil spring belt 80 is trained over the two pulleys. It is mounted under slight tension so that as long as both reels are freely rotatable, either one will drive the other at the same angular speed when the pulleys are the same size, as is preferred, or at a fixed ratio if the pulleys are of different size. However, if either pulley is retarded by tension building up in the film strip which normally extends between them and is wound on both of them, then the driving action of the other pulley will result in belt slippage, thus relieving the tension and preventing damage to the film.

Body 68 is provided with a light aperture 82, and an apertured film guide 84 directly overlies such aperture. Either or both of the apertures may be provided with a glass plate to assist in guiding film therethrough and maintaining it substantially flat in the plane of the body 68. When the cartridge is properly mounted in the projector as seen in FIGURE 4, this plane is, by design, the focal plane of lens 40. Below the film gate, body 68 is provided with a pair of narrow, elongate slots 86 for the free reception of the sprocket teeth of a sprocket arranged to advance the film along the length of the body and through the projector. Either or both of these slots may be formed by a cut-out portion of the side edge of the body if desired.

In the area of slots 86, the body is bent out of its plane in an arcuate curve at 88 on a radius of substantially the same dimension as the radius of the sprocket to be used with the cartridge. A film guide 90 is carried by body 68 near each end adjacent to the mounting means 70 and serves to complete the control of the travel of film 92 from one reel to the other. Apertures 94 are formed in the body above the film gate to fit over guide pins 96 in the projector and properly align the cartridge in slot 46.

Sprocket 98, provided with sprocket teeth 100 is fixedly mounted on sprocket shaft 102 which in turn is rotatably mounted in the projector. When the shaft and sprocket are rotated, the sprocket teeth engage the usual sprocket holes along the margins of film strip 92 and advance it along the length of the body 68 and through the projector from one reel 76 to the other, depending on the selected direction of drive. It will be seen that, since the curve 88 substantially matches the curvature of the sprocket, there will be a plurality of teeth simultaneously in engagement with the sprocket holes at all times, thus reducing the load on each sprocket hole and greatly reducing the likelihood of damage or breakage.

One of the important features of the invention results from the combination and arrangement of parts as shown in which the only direct and positive drive to the film strip is provided by sprocket 98. The supply and takeup reels are freely mounted, and the only restraining loads on the film are its own inertia and the small amount of friction resulting from passage of the film through the guides. In the usual arrangement where the takeup reel is positively driven, if the film jams at the film gate the resulting tension produced by the takeup reel can damage or even break the film.

In the present arrangement, considering FIGURE 4, if the sprocket is driven counterclockwise it pulls the film down. The unwinding from the upper reel causes it and its pulley 78 to also rotate counterclockwise. Belt 80 in turn rotates the lower reel to wind up the film. Since the pulleys are the same size, both reels rotate at the same angular rate. At the beginning of the operation the effective diameter of the upper reel is greater than that of the lower reel and the film will be quite loose on that reel. The ratio becomes even when half of the film is on each reel and continues to change so that near the end of the operation the lower reel is taking up relatively rapidly and the film is again snug at the end of the operation. The operation is the same when the rotation is reversed. If the operator should, by chance, manually snug up the film on the takeup reel somewhere in the middle of the operation, it will then apply tension to the film during the latter part of the operation. However, as before stated, the belt grip is quite light and it will slip before any undesirable amount of tension is built up, and the film can suffer no damage.

Shaft 102 has, fixedly mounted near one end, a pulley 104, shown in dotted lines in FIGURES 4 and 5. This pulley is driven by pulley 106 through the medium of belt 108, both shown in FIGURES 4 and 5. Pulley 106 is driven by motor 110 by means of an electrically operated clutch, not shown, which may be any conventional magnetic or electromagnetic type, actuated by relay 112. If desired, a dynamically braked D.-C. motor can be substituted for motor 110 and its clutch. Cam 114 is also fixedly mounted on shaft 102 and is provided with four lobes 116 and four recesses 118. The number may be varied but the arrangement shown has been found to be very satisfactory in practice.

A two-way switch 120, preferably but not necessarily a snap switch, is provided with an actuating arm 122 having a cam follower 124 at its end in engagement with the cam. In the position shown, with the cam follower in a recess 118, blade 126 extends between terminal 128 and terminal 130. When the cam follower is raised by a lobe 116 the blade swings over to terminal 132. When the cam follower drops in the next recess, the blade returns to terminal 130. A similar switch 134 with an actuating arm 136 and cam follower 138 is so mounted that its cam follower is contacted by arm 122 shortly after it begins its rise. This switch similarly has a blade 140 extending as shown from terminal 142 to dummy terminal 144. When arm 136 is displaced by arm 122, blade 140 swings over to terminal 146, and it returns to terminal 144 when cam follower 124 drops into a recess. These movements make and break various circuits as fully explained hereinafter to cause automatic operation of the film advancing mechanism.

Returning to FIGURE 2, a standard power supply line 148 is connected to a terminal block 150 mounted on a side wall of the sound reproducing device 20 and supplies power for driving the photograph motor and motor 110, as well as for operating the reproducer and the automatic control system. Control column 152 is tied into the terminal block in conventional fashion through multiple conductor 154 and is provided with a plurality of switches to make and break circuits for the control of various functions. Multiple conductor 156 leads from the terminal block to the projector where most of the functions are to be performed. "On-Off" volume switch 158 controls all of the power in the apparatus and switch 160 is a tone control for the sound reproducer.

Control column 152 is diagrammatically illustrated in FIGURE 7 and the various circuits which it controls are shown in FIGURE 6. The control column includes a barrier strip 162 for the connection of lines 1 through 8 as shown. Operation of switch 158 connects lines 1 and 2 and establishes ground A and hot line B. The latter leads to the switches in the control column and has branches leading to terminals 132 and 146 of switches 120 and 134, shown in FIGURES 5 and 6.

The switches on the control column connect hot line B to the various system lines as shown in FIGURE 7. Switch 164 turns the sound reproducer or phonograph motor on and off. Switch 166 turns the projection lamp on and off. Switch 168 connects the automatic control circuitry. Switch 170 connects alternate circuits to motor 110 to drive it in opposite directions. Switch 172 closes a circuit which provides direct manual control of the film advance.

Operation of the apparatus in the automatic regime will now be described. With a film strip mounted on the supply and takeup reels and threaded through the projector with the first frame aligned with the film gate, line 148 is plugged into a power supply and switch 158 is turned on. The cooling fan operates automatically. Switch 170 is moved to connect line 7 to motor 110 and cause it to run in the "forward" direction. Switch 168 is closed to connect line 5 into the circuit. Switch 166 is closed to turn on the projection lamp. Switch 164 is closed to turn on the phonograph motor. The narration now commences and continues, reproducer 20 sending the appropriate signals to speaker 174. When the narration for the frame which has been projected concludes, a low frequency signal impressed in the sound source is transmitted to the reproducer. This signal is picked up by filter 176, filtered out of the audio circuit, and transmitted to the sensor relay 178, which closes switch 180 to connect line 5 into a first conductor path 182 through switch 184. This conductor path leads to terminal 130 of switch 120, through blade 126 and terminal 128, and through line 186 to clutch relay 112.

Energization of relay 112 causes the clutch to engage, rotating pulley 106, FIGURE 5, to rotate cam 114 through belt 108. Since sprocket 98 is also mounted on shaft 102 it rotates with cam 114. Lobe 116 now contacts cam follower 124 and displaces it outwardly which causes blade 126 to swing over to terminal 132 where it remains while the cam follower is riding the surface of lobe 116. As seen in FIGURE 6, this movement of blade 126 closes a second conductor path 188 directly from hot line B through line 186 to the clutch relay, and the clutch will remain engaged as long as this circuit remains closed.

After cam follower 124 rises a short distance, its arm 122 contacts cam follower 138, swinging blade 140 from the dummy terminal to terminal 146. This now closes a third conductor path 190 from hot line B through contact 146, blade 140, and terminal 142 and line 192, which leads to relay coil 194 and to ground A. Energization of the relay coil draws switches 184 and 196 from their position as shown, thus disconnecting line 5 from conductor 182, and causes them to contact terminals 198 and 200 of branch 202. This completes a circuit from line 5 through the relay coil to ground A. This holding circuit continues as long as switch 180 is held closed by relay 178 in response to the signal from filter 176, which is usually of the order of one second.

When cam 114 has turned 90 degrees, in the case of a four lobe cam, follower 124 will drop into the next recess 118, blade 126 will leave terminal 132 and return to terminal 130, and conductor path 188, 186 from hot line B to clutch relay 112 will be disconnected. Since conductor path 182 remains disconnected because of the action of the solenoid, current will cease to flow to the clutch relay 112, and pulley 106 will no longer drive shaft 102. Therefore, both cam 114 and sprocket 98 will cease rotation. Dimensions are selected so that this quarter turn will advance the film exactly one frame.

The signal emitted by the record is purposely made longer than the time required for the quarter turn to take care of possible delay in the action of the clutch. Consequently conductor path 182 must be promptly opened and held open by the solenoid and holding circuit for the duration of the signal. Otherwise, when switch 120 returns to its original condition the clutch would be actuated again, advancing the film out of synchronism with the narration.

When the described operation has been completed, the next narration will take place, followed by another signal and a repetition of the film advancing operation. Thus it will be seen that the apparatus provides for the showing of a complete film, one frame at a time, with narration synchronized with each frame, entirely automatically.

If the operator wishes to manually control the advance of the film and supply his own narration, he will open switch 168 to disconnect line 5. He can then close switch 172 which connects line 8 to terminal 130 and the film advance will operate in the same way. In this case, operation of the holding circuit will have no effect since line 5 has been cut out. If the operator wishes to provide step by step advance and stop, he will close switch 172 just long enough to actuate the clutch and initiate the advance. It will then go through a single cycle and stop. If he wishes to advance the film rapidly, he merely holds switch 172 closed, and each new cycle will start as soon as the previous one stops.

If the apparatus is on automatic and the operator wishes to interrupt a sequence and go back to a previous frame for discussion, he opens switch 164 which stops the phonograph motor. He then moves switch 170 to reverse, closes switch 172 and moves rapidly back to the desired frame. After the discussion he moves ahead to the frame corresponding to the narration at the point of interruption, and turns on the phonograph motor. The narration will then continue in correct synchronism with the film.

It will be apparent to those skilled in the art that various changes and modifications may be made in the construction and arrangement of parts as disclosed without departing from the spirit of the invention and it is intended that all such changes and modifications shall be embraced within the scope of the following claims.

I claim:
1. An audio-visual display apparatus comprising the combination of a sound reproduction device and a projector; said second reproduction device including means to emit a series of signals at predetermined intervals, each signal having an appreciable time of duration; said projector including a projection zone; means responsive to each signal to complete a circuit from an electrical power source to said drive means to initiate its action, said signal responsive means remaining active for the duration of each signal; means responsive to initial movement of said drive means to disconnect it from said first circuit and to complete a second circuit from an electrical power source to said drive means and responsive to completion of a predetermined cycle of movement of said drive means to disconnect said second circuit and reconnect said first circuit; and additional means also responsive to initial movement of said drive means to break said first circuit and establish a holding circuit to said power source; said additional means remaining active for the duration of said signal to hold open said first circuit and prevent repetitious actuation of said drive means through its cycle of motion in response to the same signal.

2. An audio-visual display apparatus comprising the combination of a sound reproduction device and a projector; said sound reproduction device including means to emit a series of signals at predetermined intervals; said projector including a projection zone; electro-mechanical drive means to transport a film strip through said projection zone; first and second conductor paths to conduct electricity from an electrical power source to said drive means; a first switch in said first conductor path; means responsive to said signals to close said first switch to initiate the action of said drive means; a second switch common to both of said conductor paths; and means driven by said drive means to move said second switch to disconnect said first conductor path and connect said second conductor path upon initiation of movement of said drive means; said driven means acting upon completion of a predetermined amount of movement to return said second switch to its original position to disconnect said second conductor path.

3. Apparatus as claimed in claim 2; and a branch conductor path to connect said power source to said first conductor path at a point between said first and second switches; and a manually operated switch in said branch conductor path.

4. Apparatus as claimed in claim 2; said driven means comprising a rotatable cam having a plurality of lobes and recesses; said second switch having a cam follower; said switch and cam being so arranged with respect to each other that said switch completes the circuit in said first conductor path when its cam follower lies in a recess and completes the circuit in said second conductor path when its cam follower is displaced by a lobe.

5. Apparatus as claimed in claim 2; and in addition thereto, a control relay adapted to open the circuit through said first conductor path; a third conductor path adapted to connect the power source to said control relay; and a switch in said third conductor path adapted to complete the circuit from the power source to the control relay upon initiation of movement of said drive means; said control relay including a holding circuit and adapted to hold open the circuit through said first conductor path for the duration of each of said signals.

6. Apparatus as claimed in claim 5; said third switch being actuated by movement of said second switch.

References Cited by the Examiner

UNITED STATES PATENTS

| 2,070,226 | 2/1937 | Erwood | 352—34 |
|---|---|---|---|
| 2,624,232 | 1/1953 | Kingston | 352—83 |
| 2,699,089 | 1/1955 | Jacobs et al. | |
| 2,856,812 | 10/1958 | Barron. | |
| 2,975,672 | 3/1961 | Shields | 88—28 |
| 3,180,213 | 4/1965 | Parker | 88—28 |
| 3,181,421 | 5/1965 | Nimke et al. | 88—28 |
| 3,187,626 | 6/1965 | Mindell et al. | 88—28 |
| 3,235,510 | 2/1966 | Harrison et al. | 88—28 |

NORTON ANSHER, *Primary Examiner.*

V. A. SMITH, *Assistant Examiner.*